Dec. 3, 1935.  H. L. THACKWELL  2,023,295
SLUDGE DIGESTING TANK
Original Filed Jan. 21, 1930  2 Sheets-Sheet 1
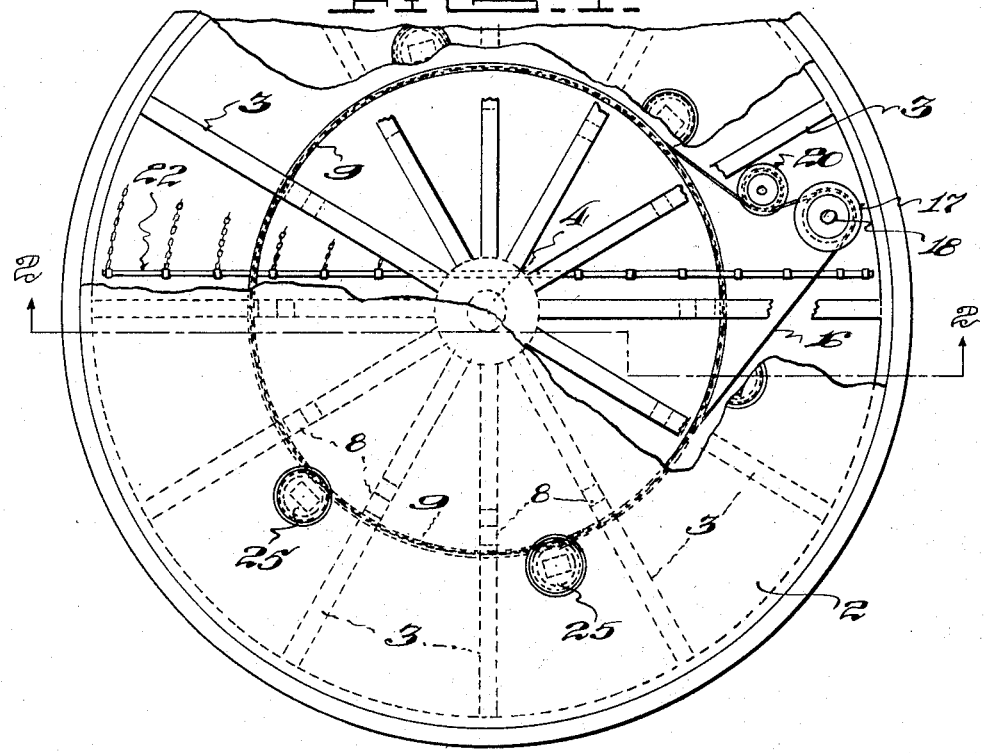
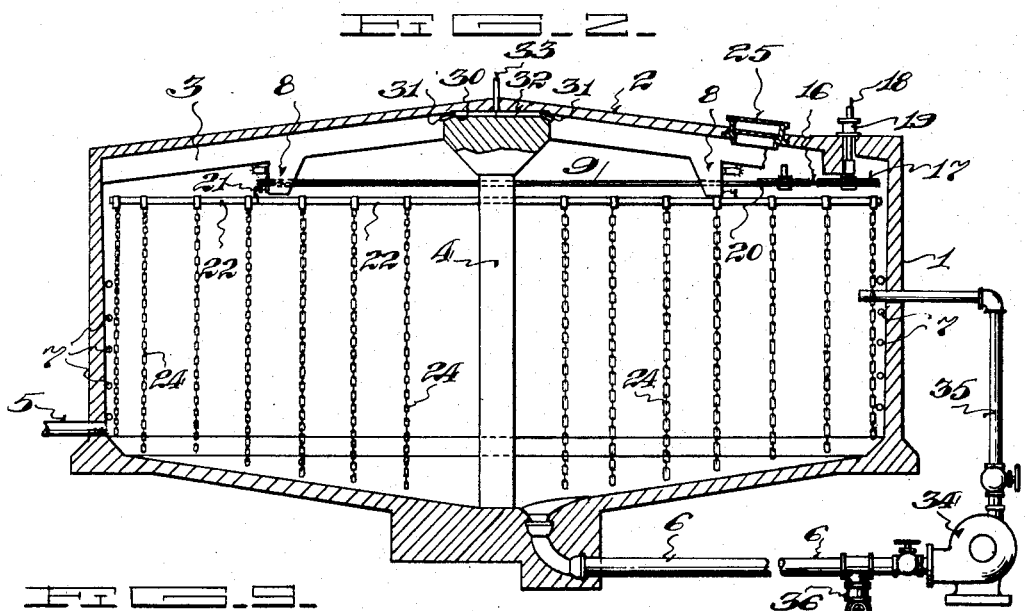
Henry L. Thackwell
INVENTOR.
BY Ernest A. Wood
ATTORNEY.

Dec. 3, 1935.  H. L. THACKWELL  2,023,295
SLUDGE DIGESTING TANK
Original Filed Jan. 21, 1930   2 Sheets-Sheet 2
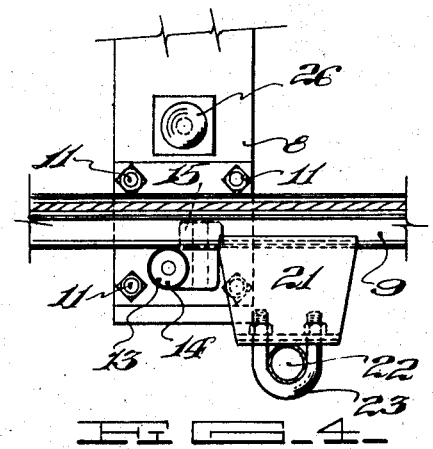
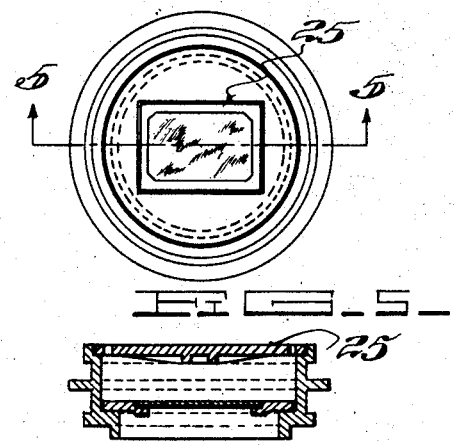
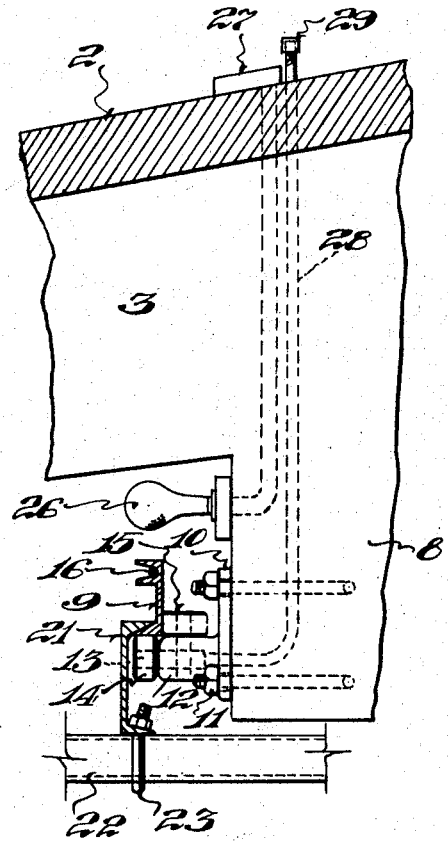
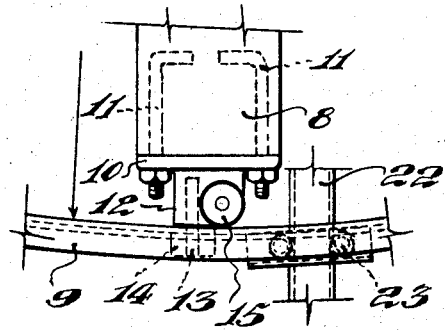
Henry L. Thackwell
INVENTOR.
BY Ernest A. Wood
ATTORNEY.

Patented Dec. 3, 1935

2,023,295

UNITED STATES PATENT OFFICE 2,023,295

SLUDGE DIGESTING TANK

Henry L. Thackwell, Jacksonville, Tex., assignor to The Dorr Company, Inc., New York, N. Y., a corporation of Delaware Application January 21, 1930, Serial No. 422,476
Renewed March 10, 1932

14 Claims. (Cl. 210—2)

This invention relates to sludge digesting tanks the function of which is two-fold, one being to effect bacteriological action for the conversion of certain organic substances into other forms, and the other function being to cause sedimentation of solids in suspension. This invention has to do with both these aspects and it has particular reference to a tank for digesting the solids in sewage and the principal object of the invention resides in the provision of an exceptionally novel and simplified construction for the purpose of reducing these solids to an inoffensive residue which can be disposed of without nuisance.

Another object of the invention resides in the provision of a tank of the character designated which is so constructed that it may contain gases which may be removed by vacuum, whereby the gases so removed may be utilized in heating water which in turn is circulated back through the tank by pipe coils, and further the provision of a mechanism capable of stirring the sludge in the tank, whereby the sludge is agitated to release said gases, which if not released, hinder the digestion of the sludge.

The invention further comprehends the provision of a tank having a cover with gas proof manholes over which is placed transparent material which would permit inspection without admitting air, or releasing gas and broadly a tank which would permit of the digestion of sewage sludge without nuisance and odors.

With these objects as paramount the invention has particular reference to its salient features of construction and arrangement of parts, to become manifest as the description proceeds, taken in connection with the accompanying drawings, wherein:

Figure 1 is a plan view of the improved sludge digesting tank with portions broken away to illustrate the interior construction thereof.

Figure 2 is a sectional elevation of Figure 1 on lines 2—2 thereof.

Figure 3 is a detailed view of a portion of the bull wheel showing a partial view of the agitator suspending means.

Figure 4 is a plan view of one of the inspection windows.

Figure 5 is a sectional view on lines 5—5 of Figure 4.

Figure 6 is a view of the top cover of the gas proof manhole.

Figure 7 is a fragmentary view showing a portion of the ceiling of the tank, and further showing the means for illuminating the interior of the tank for inspection purposes, as well as showing the means for lubricating the bull wheel bearings.

Figure 8 is a plan view fragmentarily showing the construction illustrated in Figure 7, and Figure 9 is a detail view of the exhaust pipe or header spider.

Sewage sludge digesting tanks have heretofore been constructed with a steel bridge which must be of such strength and durability as to support a movable shaft to which is attached movable arms, vanes or members. This bridge is obviously an expensive structure and its weight, together with the necessary re-enforcing elements necessitates more substantial re-enforcement of the tank itself. The present invention contemplates the central column upon which is supported a roof, from which roof is suspended the several agitating elements by which the sludge is kept constantly in motion, during the process of digestion. This post or column is no deterrent in the proficient function of a tank such as herein illustrated and described and in fact, the present invention makes use of this central post for affording a substantial support for the roof or ceiling of the tank from which roof or ceiling depends a very effective support for the several sludge agitating elements. Accordingly, an economical structure is provided meeting in every respect with the requirements of an apparatus of this character.

Accordingly, the invention is comprised of a tank 1 having a roof or ceiling 2, the latter being re-enforced by beams 3 and supported upon the center post or column 4 at its apex. The tank is provided with an inlet at 5 and an outlet at 6 and adjacent the interior surface of its wall there is provided heating coil 7, which coil extends completely around the inner area or diameter of the tank.

It will be noted in Figures 2, as well as in Figures 3 and 7, that the beams 3 are so constructed as to define depending shoulders 8, which shoulders are employed for the purpose of supporting mechanism upon which operates a bull wheel 9. This mechanism is comprised primarily of a casting 10, held securely to said shoulder 8 by means of bolts 11, such as shown particularly in Figures 3, 7 and 8, and having a protuberant bearing 12, into which extends a stub shaft 13, upon which is mounted a roller 14 and upon which roller the weight of the bull wheel 9 rests. A series of guide rollers 15 are provided which engage the inner periphery of the bull wheel and thus prevent displacement of the latter in rotation.

It will be noted in the figures that the bull wheel is grooved to receive a cable 16, which cable surrounds the bull wheel, as shown in Figure 1, and continues around a drive wheel 17, the latter being provided with a shaft 18, which extends upward through the roof of the tank and carries a wheel 19 to which rotation may be imparted by any suitable mechanism, not shown. An idler wheel 20 subjected to constant tension is provided to maintain tension upon the cable and said tension may be adjusted as desired.

Supported on the bull wheel by means of an element 21, welded or otherwise suitably affixed to the bull wheel 9 is a cross member 22 and is held by said member 21 by means of U-bolts 23. Suspended from the cross member 22 is a series of chains and rods or other flexible or rigid elements 24, such as shown in Figure 2, which members depend downwardly to a point near the bottom of the sludge tank 1, which bottom, as is apparent in Figure 2 converges to a common point of discharge favorable to the passage of settled solids as sludge through the outlet 6.

It is very apparent from the foregoing that rotation of the wheel 19 on the roof of the tank will impart rotation to the bull wheel within the tank through the medium of the cable 16, which action will drag the agitators 24 through the sludge and thereby continuously agitate the same, which agitation, combined with the heat radiated throughout the tank by the heating coils 7 will tend to promote the bacteria present in the sludge and consequently by their biological action on the solids will obtain an inoffensive residue which may be discharged through the pipe or outlet 6 for disposal without nuisance.

It becomes necessary on frequent occasions to observe the condition within the tank which observation must be made without disturbing the partial vacuum within the tank by letting air thereinto. Accordingly, windows 25 are provided at spaced points upon the roof 2, and under each of these windows is provided an incandescent light globe 26, connected with which is a suitable switch 27 adjacent each window. The inspection therefore is required only to throw the switch and view the interior of the tank without interfering with the process of digestion by opening the tank.

In Figure 7, it will be noted that the rollers 13 and 15, as well as other operative parts, may be very conveniently lubricated through the medium of a tube 28 communicating with these rollers and accessibly extending above the roof of the tank where there is provided a cover 29.

It is very apparent from the foregoing that the sludge digesting tank herein described may be erected at a comparatively low cost due particularly to its simple construction and mode of operation, neither of which will materially reduce its proficiency and effectiveness below that of the more elaborate and expensive types of sludge digesting tanks and apparatus. The operation of this invention is deemed to be apparent from the description of the elements of which it is composed, and it is not considered necessary herein to specifically describe such operation.

It is of particular importance in the operation of the sludge tank to withdraw the gaseous content, due to the fact that bacteria and any other biological organisms are depressed and inhibited by their own enzymes which are toxic to them and thereby are inhibitory to the growth and development of the bacteria present in the sludge, which bacteria is the agent by which effective digestion of the sludge is obtained. In short, the gases are withdrawn to accelerate the growth and development of the actual digestive agent in the tank, to obtain an optimum condition therein.

To accomplish the foregoing, an arrangement such as shown in Figure 9 is provided and consists of a circular hollow ring 30 or series of connected tubes, having a plurality of inlet nipples 31. This device is embedded in the top of the center column to allow the nipples 31 to communicate with the interior of the tank. A cross tube 32, having an upwardly extending tube 33 provides an exterior connection for a suction tube by which the gaseous content of the tank may be exhausted.

It is further pointed out that circulation of the sludge is obtainable, if such is desired, through the medium of the pump 34, drawing the residue out of the tank through pipe 6 and redepositing the same into the tank at a point adjacent its top through pipe 35. A take-off pipe 36 is provided in pipe 6 in event it is not desired to circulate the residue. Suitable valves, by which the flow may be controlled, are also provided.

Manifestly, the construction shown is capable of considerable modification and such modification as is considered within the scope and meaning of the appended claims is also considered within the spirit and intent of the invention.

What is claimed is:

1. A sludge digesting tank having a roof provided with a series of inspection windows, the said roof having beams provided with shoulders radially spaced from the center of said roof, a wheel rotatably supported by said shoulders and carrying a cross member and agitating elements fixed to and depending from said cross member.

2. In a sludge digesting tank, a vertical column centrally disposed within said tank, a series of radially extending beams carried by the upper end of said column provided with shoulders intermediate their ends, a top supported on said column and beams, a rotatable member supported by said shoulders beneath the top and agitating means carried by said rotatable member.

3. A sludge digesting tank for digesting the solids in sewerage from which air is excluded and gas removed, comprising a vertical column centrally disposed in said tank, a series of radially extending beams carried by the upper end of said column provided with shoulders intermediate their ends, a top supported on said column and beams, a rotatable member supported by said shoulders, agitating means carried by said rotatable member, and a circular tubular outlet member disposed between the upper end of the column and top, said member having a series of radially spaced inlet ports within the tank and a centrally disposed outlet port terminating exteriorly of said tank.

4. A tank for digesting the solids in sewage having an inlet and an outlet, the said tank being constructed to exclude air and from which gas is exhausted and having a top provided with shoulders depending interiorly of said tank, a revolving member supported by said shoulders and carrying agitating elements and means for driving said member for actuating said agitating elements through the contents of said tank to reduce the same to a liquid residue for discharge.

5. A tank of the character described constructed to exclude air and from which gas is exhausted and having observation windows and means to illuminate the interior, the roof of said tank having depending shoulders and supported by a central post, a rotating member surrounding said post and supported by said shoulders and carrying an offset structure for supporting a series of agitating elements and means for driving said rotating member whereby to pass the agitating elements through the contents of said tank to reduce the solids therein to an inoffensive discharge.

6. A sludge digesting tank for digesting the solids in sewerage from which air is excluded and gas removed, comprising a vertical column centrally disposed in said tank, a top supported in part by said column, movable agitating means supported by said column, and a hollow circular gas outlet member disposed between the upper end of the column and top, said member having a series of radially spaced inlet ports within the tank, and a centrally disposed outlet port terminating exteriorly of said tank.

7. A sludge digesting tank for digesting the solids in sewerage from which air is excluded and gas removed, comprising a vertically disposed column in said tank, a top supported in part by said column, agitating means in said tank, and a hollow gas outlet member disposed between the upper end of the column and tank, said member having a series of spaced inlet ports within the tank and an outlet port terminating exteriorly of said tank.

8. A sludge digesting tank having a top, a circular member beneath the top, means connected to and depending from the top and being of circular formation for rotatably mounting said member directly from the top, agitating elements connected to and depending from the circular member, and means to rotate the circular member.

9. A sewage digester having in combination a bottom, a boundary wall, and apertured top having its periphery supported from said wall, a stationary pier, a rotatable sludge discharge mechanism encircling said pier, means supported from said pier for sustaining the inner edges of said top, and motor means located above said digester top for propelling said sludge discharge mechanism.

10. In a sludge digester tank, a roof, a stationary center pier, rotating arms encircling said pier, and chains co-acting with said arms to agitate sludge in the digester.

11. A digester having a boundary wall, a bottom, a pier upstanding from said bottom, a gas-tight roof including roof elements supported at one end from said wall and at their other end from said pier, sludge discharge mechanism encircling said pier; and motor means extending above said roof for driving said mechanism characterized by having said pier form the combined support for said roof elements, said mechanism and said motor means.

12. A sewage digester having in combination a bottom, a boundary wall, an apertured top having its periphery supported from said wall, a stationary pier, a rotatable sludge discharge mechanism encircling said pier, means supported from said pier for sustaining the inner edges of said top, and motor means located above said digester top for propelling said sludge discharge mechanism.

13. A sedimentation unit comprising a tank having a boundary wall, a bottom with a settled solids discharge section, an upstanding stationary pier, and a stationary structure extending from said pier and deriving support from said pier; an inlet for feeding a liquid solids mixture into the tank; arms extending outwardly from the region of the said pier to the region of said boundary wall and carrying depending members extending downwardly substantially to said bottom, a turnable pier-encircling construction supported in dependent position from said structure; and rotating mechanism for actuating said turnable construction by forces imparted thereto at the upper section thereof; said arms being carried entirely by said turnable construction and extending outwardly from the lower section thereof.

14. Sedimentation apparatus comprising in combination a sedimentation tank with a bottom, a boundary wall, an upstanding stationary pier, and stationary top members extending from said pier to said boundary wall deriving support from the pier and the wall; arms carrying sludge engaging elements movable within said tank in closed paths about said pier; a turnable construction deriving its support from said top members at sections of said members intermediate of said pier and said wall; means for operatively supporting said arms from said turnable construction, and means for turning said turnable construction about a vertically extending axis.

HENRY L. THACKWELL.